(12) United States Patent
Deffenbaugh et al.

(10) Patent No.: US 7,477,992 B2
(45) Date of Patent: Jan. 13, 2009

(54) METHOD FOR COMBINING SEISMIC DATA SETS

(75) Inventors: Max Deffenbaugh, Houston, TX (US); Ramesh Neelamani, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 11/340,011

(22) Filed: Jan. 24, 2006

(65) Prior Publication Data

US 2006/0190181 A1 Aug. 24, 2006

Related U.S. Application Data

(60) Provisional application No. 60/654,693, filed on Feb. 18, 2005.

(51) Int. Cl.
*G01V 1/00* (2006.01)
*G01V 1/28* (2006.01)
(52) U.S. Cl. ...................................................... 702/14
(58) Field of Classification Search .................. 702/14, 702/17, 69, 191, 190, 194, 195; 367/43, 367/45
See application file for complete search history.

(56) References Cited

U.S. PATENT DOCUMENTS

| | | | | |
|---|---|---|---|---|
| 4,486,865 | A | | 12/1984 | Ruehle .......................... 367/24 |
| 4,809,238 | A | * | 2/1989 | Bishop et al. .................. 367/46 |
| 4,979,150 | A | | 12/1990 | Barr .............................. 367/24 |
| 5,621,700 | A | | 4/1997 | Moldoveanu ................. 367/24 |
| 5,835,451 | A | | 11/1998 | Soubaras ....................... 367/24 |
| 5,991,238 | A | | 11/1999 | Barr .............................. 367/62 |
| 6,049,507 | A | | 4/2000 | Allen ............................ 367/21 |
| 6,678,207 | B2 | | 1/2004 | Duren ........................... 367/24 |
| 7,006,800 | B1 | * | 2/2006 | Lashkarian et al. ......... 455/67.11 |
| 7,054,750 | B2 | * | 5/2006 | Rodney et al. .................. 702/9 |
| 2003/0176975 | A1 | * | 9/2003 | Matteucci et al. ............. 702/17 |
| 2004/0059265 | A1 | | 3/2004 | Candy et al. ................... 601/2 |
| 2006/0126434 | A1 | * | 6/2006 | Intrator ........................ 367/135 |

FOREIGN PATENT DOCUMENTS

GB 2338302 12/1999

OTHER PUBLICATIONS

Amundsen, L. (2001) "Elimination of Free-Surface Related Multiples Without Need of the Source Wavelet," *Geophysics*, vol. 66, No. 1, pp. 327-341.

(Continued)

*Primary Examiner*—Michael P Nghiem

(57) ABSTRACT

A method for combining seismic data sets has application in merging data sets of different vintages, merging data sets collected using different acquisition technologies, and merging data sets acquired using different types of sensors. In one embodiment, a desired data trace is to be determined from a set of measured data traces, and the following steps are applied: (a) model filters are constructed which express the deterministic relationship between the desired data trace and each available measured trace that depends on the desired data trace; (b) the noise properties associated with each measured data trace are determined; (c) a sufficient statistic for the desired data trace is formed by application of an appropriate filter to each measured trace and summing the filter outputs; (d) the sufficient statistic is further processed by a single-input single-output estimator to construct an estimate of the desired data trace from the sufficient statistic.

18 Claims, 7 Drawing Sheets

OTHER PUBLICATIONS

Amundsen, L. et al. (2001) "Multidimensional Signature Deconvolution and Free-Surface Multiple Elimination of Marine Multicomponent Ocean-Bottom Seismic Data," *Geophysics*, vol. 66, No. 5, pp. 1594-1604.

Bale, R. (1998) "Plane Wave Deghosting of Hydrophone and Geophone OBC Data," *Proceedings of the Society of Exploration Geophysics*, 4 pages.

Barr, F. et al. (1989) "Attenuation of Water-Column Reverberations Using Pressure and Velocity Detectors in a Watter-Bottom Cable", *Proceedings of the Society of Exploration Geophysicists*, SA 2.6, pp. 653-656.

Cassano, E. and Rocca, F. (1973) "Multichannel Linear Filters for Optimal Rejection of Multiple Reflections", *Geophysics*, vol. 38, No. 6, pp. 1053-1061, 12 figs.

Ikelle, L. T. (1999) "Combining Two Seismic Experiments to Attenuate Free-Surface Multiples in OBC Data", *Geophysical Prospecting*, vol. 47, pp. 179-193.

Ikelle, L. T. and Amundsen, L. (2002) "Noniterative Multiple Attenuation Methods: Linear Inverse Solutions to Nonlinear Inverse Problems", *The Leading Edge*, Apr. 2002, pp. 350-355.

Lehmann, E. L. and Casella, G. (1999) *Theory of Point Estimation*, Springer.

Mayne, W. H. (1967) "Practical Considerations in the Use of Common Reflection Point Techniques", *Geophysics*, vol. XXII, No. 2, pp. 225-229, 4 figs.

Neelamani, R. et al. (2004) "For WaRD: Fourier-Wavelet Regularization Deconvolution for Ill-Conditioned Systems," *IIEE Transactions on Signal Processing*, vol. 52, No. 2, pp. 418-433. (XP002340621).

Pham, D. T. et al. (1990) "Efficient Computation of Autoregressive Estimates Through a Sufficient Statistic," *IEEE Transactions on Acoustics, Speech and Signal Processing*, vol. 38, No. 1, pp. 175-177 (ISSN: 0096-3518).

Rickett, J. E. and Lumley, D.E. (2001) "Cross-Equalization Data Processing for Time-Lapse Seismic Reservoir Monitoring: A Case Study from the Gulf of Mexico," *Geophysics*, vol. 66, No. 4, pp. 1015-1025.

Robinson, J.C. (1970) "Statistically Optimal Stacking of Seismic Data," *Geophysics*, vol. 35, No. 3, pp. 436-446, 2 figs.

Schalkwijk, K. M. et al. (2001) "A Decomposition and Multiple Removal Strategy for Multicomponent OBC Data," *Proceedings of the Society of Exploration Geophysicists*, Annual Meeting, San Antonio, TX, Sep. 9-14, 2001, 4 pages.

Schoenberger, M. (1996) "Optimum Weighted Stack for Multiple Suppression," *Geophysics*, vol. 61, No. 3, pp. 891-901, 14 figs.

Soubaras, R. (1996) "Ocean Bottom Hydrophone and Geophone Processing," *Proceedings of the Society of Exploration Geophysicists*, ACQ1.7, pp. 24-27.

Verschuur, D. J. and Neumann, E.I. (1999) "Integration of OBS Data and Surface Data for OBS Multiple Removal," *Proceedings of the Society of Exploration Geophysicists*, 4 pages.

Yan, Y and Brown, R. J. (2001) "The Suppression of Water-Column Multiples by Wavefield Separation and Cross-Correlation", *Proceedings of the Society of Exploration Geophysicists*, Int'l Expo and Annual Meeting, San Antonio, TX, Sep. 9-14, 2001.

European Search Report No. 112430, dated Aug. 3, 2005.

Matson, K. H. and Xia, G. (2002) "Combining Free-Surface Multiple Attenuation With Wavefield Continuation to Attenuate 3D Free-Surface Multiples on Multi-Component Ocean-Bottom Seismic Data", *Proceedings of the Society of Exploration Geophysicists*.

Paffenholz, J. (1998) "Receiver-Ghost Utilization for Random Noise in OBC Dual Sensor Processing", *EAGE Conference and Technical Exhibition*.

* cited by examiner

METHOD FOR COMBINING SEISMIC DATA SETS

This application claims the benefit of U.S. Provisional Application No. 60/654,693 filed on Feb. 18, 2005.

FIELD OF THE INVENTION

This invention relates generally to the field of geophysical prospecting and, more particularly, to seismic data processing. Specifically, the invention is a method for merging two or more seismic data sets that image overlapping subsurface regions.

BACKGROUND OF THE INVENTION

In the oil and gas industry, seismic prospecting techniques commonly are used to aid in the search for and evaluation of subterranean hydrocarbon reserves. A seismic prospecting operation consists of three separate stages: data acquisition, data processing, and data interpretation, and success of the operation depends on satisfactory completion of all three stages.

In the data acquisition stage, a seismic source is used to generate an acoustic impulse known as a "seismic wavelet" that propagates into the earth and is at least partially reflected by subsurface seismic reflectors, such as interfaces between underground formations having different acoustic impedances. The reflected signals, known as "seismic reflections", are detected and recorded by an array of seismic receivers located at or near the surface of the earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface from the recorded seismic data for use during the data interpretation stage. The image is developed using theoretical and empirical models of the manner in which the seismic signals are transmitted into the earth, attenuated by subsurface strata, and reflected from geologic structures.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

It is common for more than one set of seismic data to be available in a region. This may occur when surveys of the same region have been conducted at various times, for example, when new high-resolution surveys are acquired where older poor-quality surveys already exist or where a series of similar surveys are acquired over the production life an oil field to detect unproduced resource, as in time-lapse seismic. This may also occur when surveys with different technologies overlap, such as streamer and ocean bottom cable, and when different sensors are used to record the same seismic signal in a single survey, as in ocean bottom recordings when both hydrophones and geophones record the same seismic signal. This commonly occurs within a single survey when more than one source-receiver pair acquires reflections from essentially the same subsurface location.

When more than one set of seismic data is available in a region, a seismic image of that region can be formed by merging the information in all available data sets. The quality of this merged image is generally superior to the quality of an image formed by any one of the data sets alone.

A general-purpose optimal technique for merging seismic data sets of various vintages, acquisition technologies, or sensor types has not been previously described in a single publication. However, non-optimal techniques for merging restricted classes of seismic data sets have been described. These techniques can be divided into several types: a) techniques for merging data sets of various vintages; b) techniques for merging data sets from different acquisition technologies; c) techniques for merging data sets from different sensor types; and d) stacking techniques for merging data from source-receiver pairs at different locations. Each class of techniques is described below in greater detail.

Differing Ages. It is common in the seismic exploration industry to acquire new surveys over prospective regions where older, lower-resolution surveys are already available. Surveys of different vintages may differ in the density and geometry of measurement locations. Modern marine surveys typically have receivers positioned in a wide swath behind a survey vessel by means of multiple towed streamers, creating three-dimensional subsurface images. Older surveys often had only a line of receivers in a single streamer behind a survey vessel, creating a two-dimensional "slice" image of the subsurface. Marine surveys may employ different air gun array configurations creating different source wavelets, different hydrophone grouping and spacing within the streamer creating different directional sensitivities, and different streamer towing depths creating different "surface ghost" effects from interference between the direct path and surface reflection. The direction of acquisition may vary, making the distribution of reflection azimuths different at subsurface reflection points. Noise levels may vary between surveys, depending on weather conditions, the presence of other vessels, or even other seismic activity. Newer surveys typically offer improved signal-to-noise ratio in the acquired data due to continuing improvements in source and receiver technology. While a newer survey may afford better image quality than an older one, both surveys contain information. In principle, by merging the surveys a new image can be formed which contains more information than was available in either survey alone.

Rickett and Lumley (2001) published an example of merging data sets of differing age in four-dimensional or time-lapse seismic, where surveys of the same region are taken at intervals of time during the production of hydrocarbons from a field. The subsurface differences observed between these surveys are due to the production of hydrocarbons and indicate which portions of a subsurface reservoir are being drained during production.

Differing Acquisition Technology. The least expensive technique for acquiring marine seismic data is the towed streamer. However it is difficult to safely operate towed streamer surveys in the vicinity of obstacles, like offshore platforms. Streamer surveys will typically divert around obstacles, and it is common practice to fill in the missing coverage near the obstacle with ocean bottom cable surveys which can be safely operated closer to obstacles.

Ikelle in two publications (1999, 2002) combines OBC data with streamer data by convolving the data types with each other. This combined data, which is shown to be an estimate of high-order multiples, is then subtracted from the measured OBC data to achieve multiple attenuation. Verschuur (1999) uses a similar approach where the data itself becomes a filtering operator to accomplish multiple attenuation in OBC data.

Differing Sensor Type. Multiple reflections pose a serious problem in marine seismic data processing. Co-located pressure and velocity measurements made at the ocean bottom can be combined—and are combined in industry practice—to produce seismic records with reduced multiple levels. Various multiple suppression techniques have been proposed in the literature based on combining bottom pressure and velocity measurements. Classifications of these techniques include direct summation, summation followed by filtering, filtering pressure and velocity records separately then summing, muting methods, and data-based surface related multiple attenuation (SRME) methods. In direct summation techniques, the pressure and velocity records are simply added together, possibly with different weightings applied to the two data sets as disclosed in U.S. Pat. No. 4,979,150, Barr (1999), and Bale (1998). In summation followed by filtering, the pressure and velocity records are added together in such a way that the summed data set can then be filtered to remove additional multiple energy. U.K. Patent No. 2,338,302 discloses a summation followed by filtering technique and U.S. Pat. No. 5,835,451, Paffenholz (1998), and Soubaras (1996) disclose techniques involving filtering pressure and velocity records separately, then summing. In muting methods, certain arrivals are identified as dominantly multiple-related by comparing the polarity of pressure and velocity measurements, and then simply muted and are disclosed in U.S. Pat. Nos. 6,678,207 and 5,621,700. Finally, Matson (2002) discloses a data-based surface related multiple attenuation (SRME) methods, where a non-linear process of autoconvolution and subtraction of the data is performed.

Differing Source-Receiver Pairs. Seismic surveys commonly obtain seismic signals from different source—receiver pairs which image essentially the same subsurface location. These signals are commonly combined to enhance the image of the common subsurface location. This combination is accomplished by aligning the reflections from the common subsurface locations in time, an operation called "moveout correction", and then summing the signals, an operation called "stacking". (Mayne, 1967) However, such a technique provides the optimal unbiased image of the subsurface location only when the moveout correction does not significantly alter the signal and when the noise in all the signals is uncorrelated, Gaussian, and of equal variance. In (Robinson, 1970), the author analyzed stacking and proposed using a SNR-based weighted stack to further minimize the noise. In addition to reducing random noises, stacking of signals from sensors at different offsets has the benefit of attenuating multiples (Cassano and Rocca, 1973; Schoenberger, 1996). In (Cassano and Rocca, 1973), the authors first filter the signal from each receiver before stacking. In (Schoenberger, 1996), the author proposes a weighted stack, with the weights determined by solving a set of optimization equations.

The filtering and summing operations involved in merging data sets can be performed temporally in time or frequency domain and spatially in offset or wavenumber domain as disclosed in Amundsen (2001), Amundsen and Ikelle (2001), Yan (2001), and Schalkwijk (2001). The use of the term "filtering" in this disclosure will include filtering operations in frequency domain and in frequency/wavenumber domain.

In Lehmann (1999), the term "sufficient statistic" is defined and its significance in estimating a set of parameters from a set of measurements described. A "sufficient statistic" is a new set of (typically fewer) numerical values which are derived from the measurements through mathematical operations and contain all the information about the parameters which was originally in the measurements. Whether a particular transformation of measurements creates a sufficient statistic for the parameters depends on the "measurement model" assumed to relate the measurements to the parameters.

In the prior art, the methods for combining seismic data sets are not designed to form a sufficient statistic for the desired data set. Accordingly, there is a need for a method that optimally merges two or more seismic data sets of the same subsurface region using a sufficient statistic. The present invention satisfies this need.

SUMMARY OF THE INVENTION

A method is disclosed for combining seismic data sets. In one embodiment, for each desired data element the following steps are applied: (a) filters are determined which express the deterministic relationship between the desired data element and each available measured data element that depends on the desired data element; (b) the noise properties associated with each measured data element are determined; (c) a sufficient statistic for the desired data element is formed by application of an appropriate filter to each measured data element and summing the filter outputs; (d) the sufficient statistic is further processed by a single-input single-output estimator to construct an estimate of the desired data element from the sufficient statistic.

In the previous embodiment, the noise properties in step (b) may be at least one noise characteristic, for example non-zero correlations between the noises in the measured data elements.

A second embodiment of the method for combining seismic data sets is disclosed. For each desired data element, the following steps are applied: (a) a set of measured data elements are obtained which contain information about the desired data element; (b) the local parameters of the measured data elements are determined, including at least water depth, bottom reflection coefficient, streamer depth, and source depth; (c) the model filters are computed from the local parameters which express the deterministic relationship between the desired data element and each available measured data element that depends on the desired data element; (d) the noise properties associated with each measured data element are determined from the local parameters and the measured data elements themselves; (e) a multi-input single-output (MISO) filter is applied to form a sufficient statistic for the desired data element from the measured data elements; (f) the sufficient statistic is further processed by a single-input single-output (SISO) estimator to construct an estimate of the desired data element from the sufficient statistic.

In the second embodiment, the noise properties in step (d) may be a noise covariance matrix of the measured data elements, for example non-zero correlations between the data elements.

DETAILED DESCRIPTION

In the following detailed description, the invention will be described in connection with its preferred embodiment. However, to the extent that the following description is specific to a particular embodiment or a particular use of the invention, this is intended to be illustrative only. Accordingly, the invention is not limited to the specific embodiment described below, but rather, the invention includes all alternatives, modifications, and equivalents falling within the true scope of the appended claims.

In one embodiment, the inventive method applies to combining seismic data sets which image overlapping subsurface locations. It is applicable when all the data sets may be regarded as being derived from the same desired subsurface image through filtering of that image and the addition of noise. This assumption about how the data sets are related to the desired subsurface image is called the "measurement model."

The processing of a large seismic data set is usually accomplished consecutively, operating on smaller units of data at a time. In the following, those smaller units of data are called data elements. The data elements are typically a seismic data trace, a portion of a seismic data trace, or a collection of portions of seismic data traces having a common feature. The common feature shared by the seismic data traces represented in a data element is typically a common receiver location, nearby receiver locations, a common subsurface reflection point, nearby subsurface reflection points, a common source location, or nearby source locations.

Figure 1:
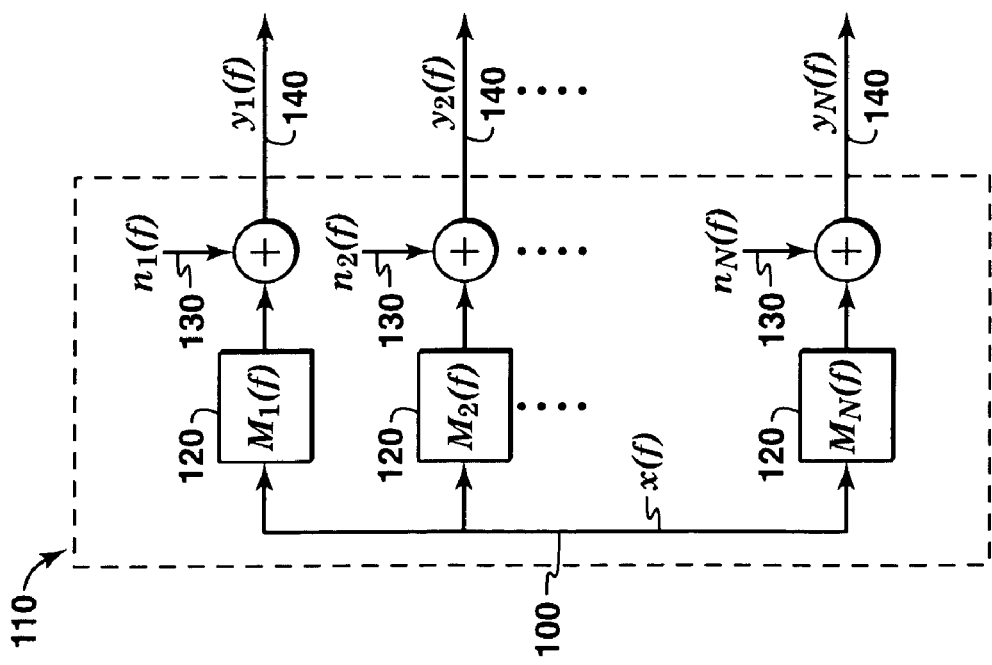
FIG. 1 shows a block diagram of the measurement model assumed to capture the essential properties of the measurements in the first embodiment.

FIG. 1 illustrates the measurement model upon which the first embodiment of the invention depends. The measurement model 110, expresses the dependence of the measured data elements 140 on the desired data element 100. The desired data element is the desired outcome from application of the inventive method. In the first embodiment, the measured data elements 140, may be regarded as being formed by filtering the desired data element 100 with a set of linear time-invariant filters, 120, where a different filter is applied to form each data set. The filtered subsurface information is then regarded as being contaminated with additive noise 130 to form the measured data elements 140. The additive noise 130 is regarded as having a known frequency spectrum, which may be different for each measured data element. The measurement model assumes that the noises are not entirely independent between data elements, so that at each frequency a covariance matrix between the noise in the various measured data elements must also be specified to fully characterize the noise.

Figure 2:
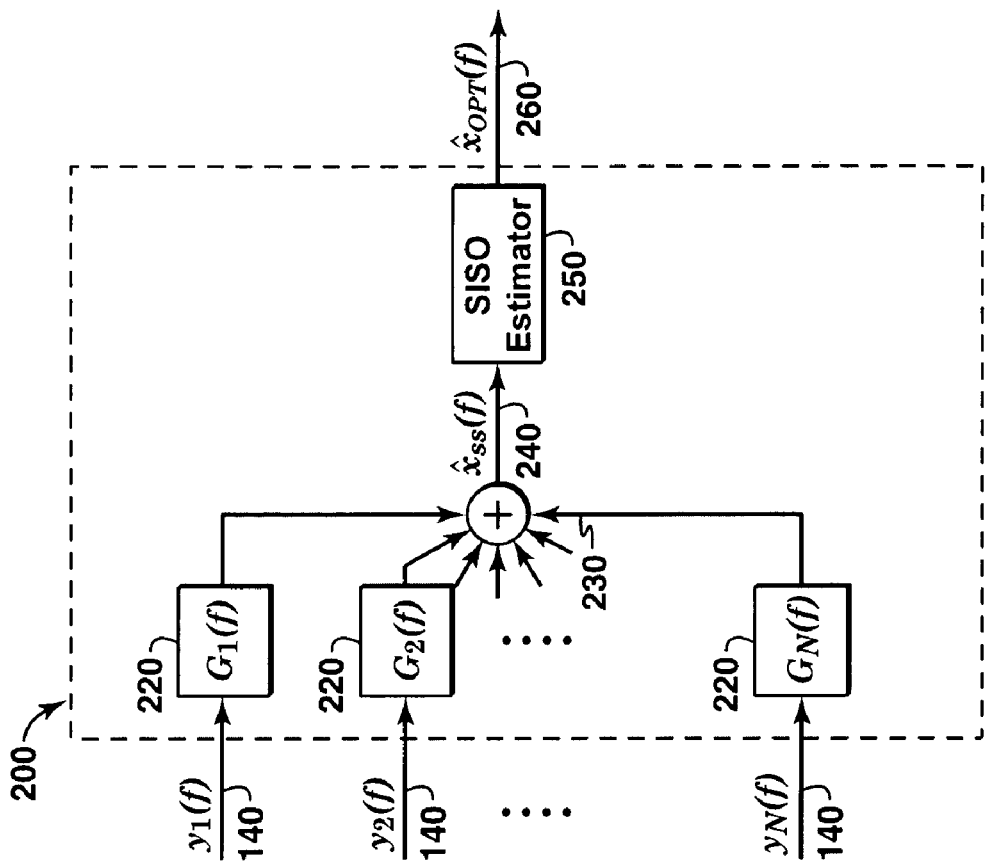
FIG. 2 shows a block diagram of the process described in the first embodiment.

FIG. 2 illustrates the estimator 200 constructed according to the first embodiment of the invention. The measured data elements 140 are assumed to have the structure imparted by the measurement model of FIG. 1. Separate linear time invariant filters 220 are applied to each measured data element, and the filter outputs are summed 230 in such a way as to form a sufficient statistic 240 for the desired data element. Finally, the sufficient statistic may be processed by a single-input single-output system (SISO) system 250 to produce an estimate 260 of the desired data element. Here the term SISO indicates that a single data element is input into the system 250 and a single data element 260 is output by the system.

Figure 3:
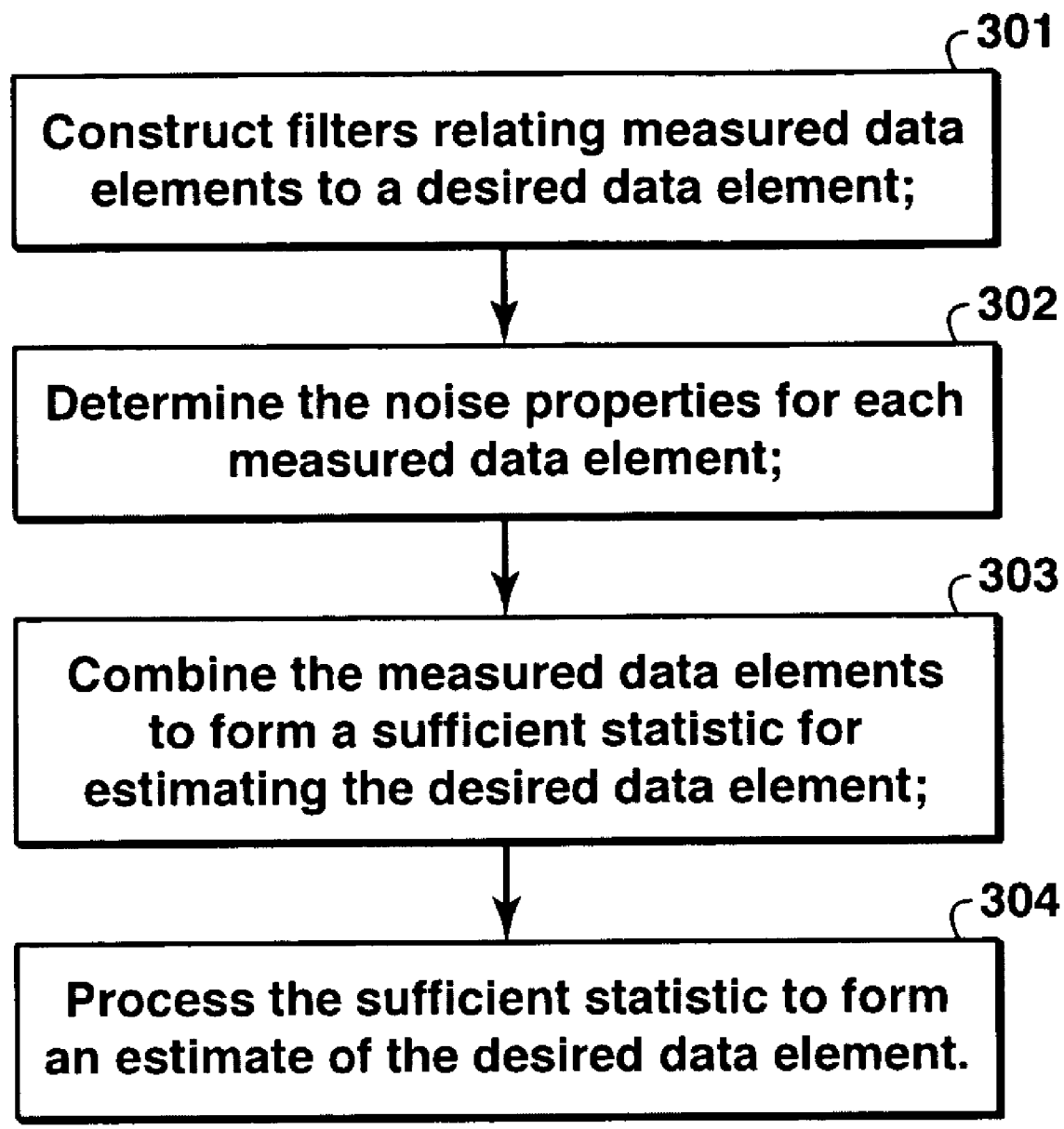
FIG. 3 is a flow chart of the first embodiment of the invention.

The first embodiment will now be described. With reference to FIG. 3, this embodiment involves procedures to combine at least two seismic data sets to form improved images of the subsurface. As illustrated in FIG. 3, the model filters are determined by relating each measured data element to the desired data element (step 301). The noise characteristics are determined from the measured data (step 302). The data sets are combined to form the sufficient statistic (step 303). The sufficient statistic is processed to form a desired data set (step 304).

Step 301 is calculation of the model filters for each data element. The inventive method assumes that the measured data elements are well described by the application of linear time and/or space invariant filters to the desired data element plus the addition of noise to the filtered desired data element. The model filters are typically different for each of the measured data elements and may also vary between individual measurement values within a data element. If the desired data element is a data trace which is a multiple-free version of measured data traces, the model filters may be determined from local parameters associated with the location of the desired trace, such as the water depth and the bottom reflection coefficient. If the desired data element is a data trace which has a particular wavelet shape, while the measured data traces have different wavelet shapes, the model filters may simply be filters that transform the desired wavelet shape into the measured wavelet shapes. If the desired data element is a stacked trace while the measured data elements are moveout-corrected traces of various offsets, the model filters may approximate the stretch applied to the wavelet by the moveout correction as well as the impulse response applied to the measured data by multiples as they vary with offset. With such descriptions of how the measured and desired data elements are related, persons of ordinary skill in the art will recognize how to specify model filters that relate the data sets. The model filter response transforming the desired data element into the ith measured data element is written in frequency domain as the complex-valued function $M_i(f)$, where f is frequency. It is convenient to write the set of these model frequency responses at frequency f as a complex-valued column vector $M(f)=[M_1(f), M_2(f), \ldots, M_P(f)]^T$, where P is the number of measured data elements that will contribute to the estimate of each desired data element. Note that if the data elements are gathers of data traces rather than a single trace or trace portion, then the model frequency responses are typically specified in frequency-wavenumber domain instead of simply in frequency domain.

Step 302 is calculation of the noise properties of each measured data element, which is labeled as item 130 in FIG.

1. The noise properties are typically captured by specifying a frequency-dependent noise covariance matrix which represents the spectral content of the noise as well as the correlations between noises in the measured data elements. This information may be obtained, for example, by using the quiet part of a data trace prior to the first break or a "noise strip" recorded at the time of data acquisition. The noise spectra could also be approximated in various ways, including assuming that the noise has a white amplitude spectrum or has an amplitude spectrum formed by filtering white noise, optionally specifying that the noise filter is the seismic wavelet. The noise covariances between different measured data elements may also be inferred from local parameters such as the bottom reflection coefficient and the water depth. The computation of the frequency dependent noise covariance matrices would also include accounting for effects of prior processing, for example moveout corrections, on the noise in the originally recorded signals. Persons of ordinary skill in the art will recognize other methods by which the noise covariance matrix between the measured data elements may be estimated from the data. These methods are also within the scope of this invention.

The noise in the jth measured data element will be written in frequency domain as the complex-valued function $n_j(f)$. It is convenient to write the complex noise amplitudes at frequency f for all P measured data elements that will contribute to the estimate of the desired data element as a complex-valued vector $n(f)=[n_1(f), n_2(f), \ldots, n_P(f)]^T$. The covariance matrix of the P noise signals at frequency f is then $R(f)=E[n(f)n^H(f)]$, where the superscript H signifies the Hermitian (or complex conjugate transpose) and E signifies the statistical expectation operator. Note that if the data elements are gathers of data traces rather than a single trace or trace portion, then the noise is typically specified in frequency-wavenumber domain instead of simply in frequency domain.

Step 303 is calculation of the sufficient statistic. In one embodiment, the sufficient statistic can be created by a MISO linear time and/or space invariant filter to the measured data elements. Such a MISO linear time invariant filter can be represented by the complex-valued row vector $G(f)=[G_1(f), G_2(f), \ldots, G_P(f)]$, where $G_i(f)$ is the single-input single-output filter to be applied to the ith measured data element prior to summing all the filtered measured data elements that will contribute to the estimate of the desired data element. One example of such a MISO filter which forms a sufficient statistic for Gaussian measurement noise is the minimum variance unbiased estimator, $$G(f)=(M^H(f)R^{-1}(f)M(f))^{-1}M^H(f)R(f)^{-1} \quad (1)$$

Persons of ordinary skill in the art will recognize that other MISO filters which are trivially related to the minimum variance unbiased estimator will also form sufficient statistics from the measured data elements. Consider an alternative MISO filter G'(f), $$G'(f)=h(f)G(f) \quad (2a)$$

where h(f) is a SISO filter. So long as h(f) does not have zero frequency response at any frequencies where Gi(f) is non-zero for at least one i, then G'(f) will also form a sufficient statistic. Additionally, all such G'(f) will have the same signal-to-noise ratio at every frequency. Such filters G'(f) which can be generated from G(f) in this way are within the scope of this invention. The preferred embodiment for forming the sufficient statistic for Gaussian measurement noise is, $$G'(f)=M^H(f)R(f)^{-1} \quad (2b)$$

which is preferred over the result of equation 1a because it does not require a potentially unstable matrix inversion. Note that if the data elements are gathers of data traces rather than a single trace or trace portion, then the sufficient statistic is typically formed by filtering in frequency-wavenumber domain instead of simply in frequency domain.

Step 304 is subsequent processing of the sufficient statistic data element by a single-input single-output (SISO) estimator to improve the estimate of the desired data element. This improvement may involve incorporating additional information about the energy or structure of the desired data element or about the noise. For example, if a certain set of basis functions (such as a wavelet basis) is thought to efficiently represent the desired data element, then the sufficient statistic can be filtered in the appropriate domain at this step. Additionally, an estimate that minimizes a particular error measure can be formed here by operating on the sufficient statistic from the previous step. Other filtering and processing schemes may be applied in this step depending on how the data elements are defined and depending on assumptions about the structure and statistical properties of the desired data element and the noise. These other filtering and processing schemes may include, but are not limited to, filtering in a curvelet domain, filtering in a complex wavelet domain, processing in tau-p or radon transform domain, processing in frequency-wavenumber domain, processing in frequency domain, and processing in time domain.

There has been significantly less research on MISO estimation than on SISO estimation. A significant aspect of the inventive method is that it transforms a MISO estimation problem into a SISO estimation problem which can then be solved using one of the wide variety of published methods. Furthermore, because the multiple measured data elements are combined into a single data element which is a sufficient statistic, all information that the original measurements contained about the desired data element is in the single sufficient statistic data element. As a result, any optimality properties (e.g., "minimum mean squared error") of the SISO estimator employed in step 304 are also enjoyed by the MISO estimator composed of the combination of steps 303 and 304.

Persons of ordinary skill in the art will recognize that steps 303 and 304 can be merged into a single MISO operation in such a way as to produce a mathematically equivalent result. All mathematical operations for combining the data elements that can be executed with equivalent result as separate and distinct steps 303 and 304 are within the scope of this invention. Unlike this inventive embodiment, current industry methods cannot be equivalently written as the formation of a sufficient statistic (based on the assumed measurement model) (step 303) followed by a SISO processing step (step 304).

Figure 4:
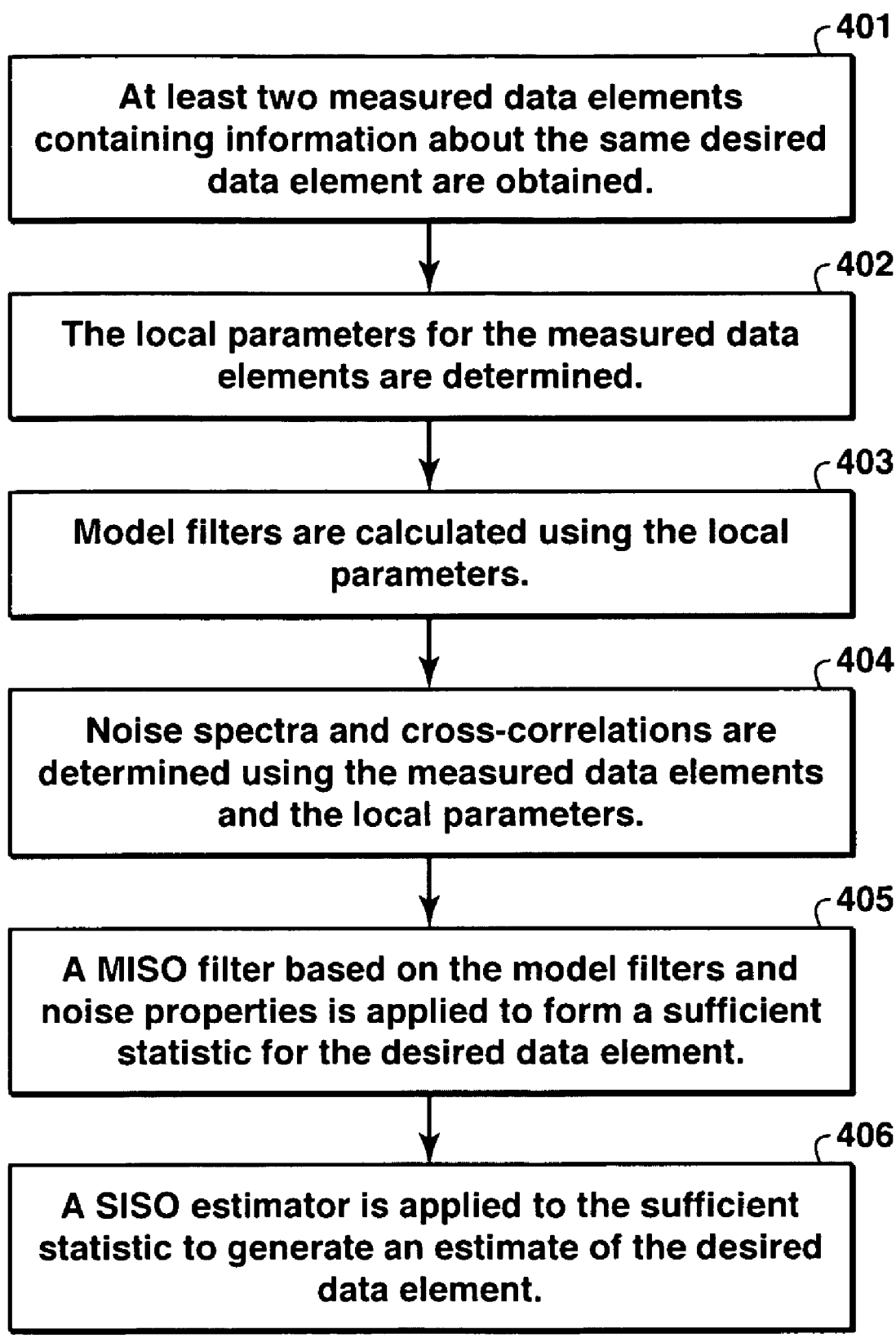
FIG. 4 is a flow chart of the second embodiment of the invention.

A second embodiment will now be described. As illustrated in FIG. 4, at least two measured data elements containing information about the same desired data element are obtained (step 401), the local parameters are determined which influence the deterministic relationship between the desired data element and the measured data elements (step 402), the model filters are calculated using the local parameters (step 403), noise spectra and cross-correlations are determined using the measured data elements and the local parameters (step 404), a MISO filter is applied to form a sufficient statistic data element from the measured data elements (step 405), and a SISO estimator is applied to the sufficient statistic to generate an estimate of the desired data element (step 406).

Step 401 is to obtain at least two measured data elements which contain information about the desired data element.

Persons of ordinary skill in the art will recognize how to obtain measured data elements which contain information about the desired data element.

Step 402 is to determine the local values of the measurement model parameters. For example, when the goal is to suppress multiples in the desired data element, the relevant local parameters are typically the relative scaling of the pressure and vertical velocity measurements, sound velocity in water, the water depth, the water bottom reflection coefficient, and stacking velocities. Example embodiments of how these may be estimated are discussed below.

The sound velocity in water is typically estimated to be approximately 1500 m/s. Alternatively, it may be determined more accurately by direct measurement of water temperature and salinity by the seismic survey vessel.

The water depth may be determined from the sound velocity and the water bottom reflection time. A variety of methods are available for determining the water bottom reflection time, including observing the delays in the autocorrelation of the seismic traces or direct measurement from the first bottom reflection.

A variety of methods are available for determining the water bottom reflection coefficient. Examples of such methods include observing peak amplitudes in the autocorrelation of the seismic data or direct measurement from the first bottom reflection.

The determination of the stacking velocities for the primaries as a function of time is commonly made as an earlier step in the processing of seismic data. This determination utilizes standard industry methods known to persons of ordinary skill in the art.

In cases where different acquisition geometries are used, data acquisition parameters such as the source depth and streamer depth are known by positioning methods. Such positioning methods are familiar to persons of ordinary skill in the art.

Step 403 is to calculate the model filters from the local parameters. The choice of appropriate model filters depends on the details of the data sets to which the inventive method is applied. Town representative examples are given below:

One example utilizes Filters for multiple suppression in pre-stack dual sensor (hydrophone and geophone) ocean bottom cable data in frequency/offset domain. In this example, $V_W$ is the sound velocity in water, d is the water depth, $R_B$ is the water bottom reflection coefficient, and $V_{RMS}$ is the moveout velocity of the primary energy at time T(0) in the zero offset seismic trace. The multiple filter for the hydrophone and geophone data respectively are, $$M_1(f) = \frac{1 - e^{i2\pi f t_W}}{(1 + R_B e^{i2\pi f t_W})^2}. \tag{3}$$

$$M_2(f) = \frac{1 + e^{i2\pi f t_W}}{(1 + R_B e^{i2\pi f t_W})^2}. \tag{4}$$

The time between multiple reflections $t_W(T(0),X)$ as a function of primary time and offset can be found from the Dix equations (Dix, 1955) by adding an additional water layer to represent the extra leg of the multiples which is within the water column. If the offset is X, and the primaries arrive at time T(0) on the zero offset seismic trace, $$t_W(T(0), X) = \sqrt{\left(T(0) + \frac{2d}{V_W}\right)^2 + \frac{X^2}{V_M^2}} - \sqrt{T^2(0) + \frac{X^2}{V_{RMS}^2}}. \tag{5}$$

Where, $$V_M^2 = \frac{T(0)V_{RMS}^2 + 2dV_W}{T(0) + \frac{2d}{V_W}}. \tag{6}$$

A second example utilizes model filters for combining data sets acquired with different wavelets. If $W_0(f)$ is the frequency spectrum of the desired wavelet, and $W_1(f)$ and $W_2(f)$ are frequency spectra of the actual wavelets in measured data traces 1 and 2 respectively, $$M_1(f) = \frac{W_1(f)}{W_0(f)}. \tag{7}$$

$$M_2(f) = \frac{W_2(f)}{W_0(f)}. \tag{8}$$

These examples of model filters for typical applications are illustrative only and are not limiting on the scope of the invention. Persons of ordinary skill in the art with the benefit of the disclosure herein will recognize appropriate model filters for combining other types of data sets.

Now referring to Step 404 of FIG. 4, the frequency-dependent noise covariance matrix between the measured elements is determined. This can be accomplished by the method described in step 302 above.

Step 405 of FIG. 4 applies a MISO filter to the measured data elements to form a sufficient statistic data element. This can be accomplished by the method described in step 303 above.

In step 406 of FIG. 4, a SISO estimator is applied to the sufficient statistic to form an estimate of the desired data element. The preferred embodiment depends on the character of the desired data element. Several examples are given below:

In one example, if the desired data element is a data trace which contains a reflectivity series which is well-characterized as a Gaussian random process with variance $\sigma_x^2(f)$ at frequency f, the preferred embodiment would typically be to form the minimum mean squared error estimate of the reflectivity series using the SISO filter. For example, if the sufficient statistic in step 405 was formed according to equation 1, then the preferred embodiment of the SISO filter would be:

$$S(f) = \left(M^H R^{-1} M + \frac{1}{\sigma_x^2}\right)^{-1} (M^H R^{-1} M) \tag{9}$$

In a second Example, if the desired data element is a data trace which contains a reflectivity series based on a discontinuous impedance profile (spiky reflectivity series), the preferred embodiment of step 406 is wavelet-transform based denoising of the signal comprising a) transforming the noisy signal to the wavelet domain, b) adaptively shrinking each wavelet coefficient to attenuate the noise and extract the signal, and c) inverting the wavelet transformation to retrieve the improved estimate. Optionally, this denoising can be preceded by adaptive Fourier filtering of the data to eliminate excessive noise from some frequencies. For discontinuous signals, formally described by the Besov signal class, this wavelet-based estimator has the property that as the noise variance decreases, the estimator's error decays no slower than that of any other estimator. Consequently, for discontinuous signals, no other linear or nonlinear estimator can significantly improve upon the asymptotic error performance as disclosed in Melamine (2004).

EXAMPLE

Figure 5A:
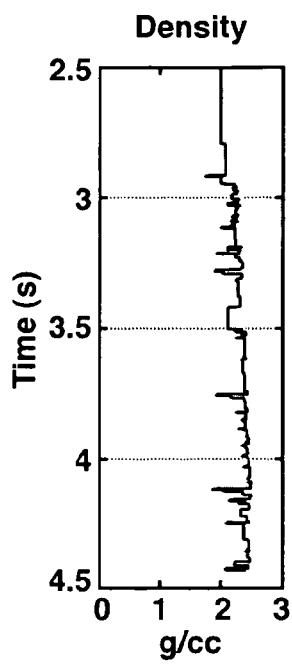
FIGS. 5(a), 5(b), and 5(c) respectively illustrate graphs of density, compressional velocity, and shear velocity versus reflection-time for a hypothetical subsurface region.
Figure 5B:
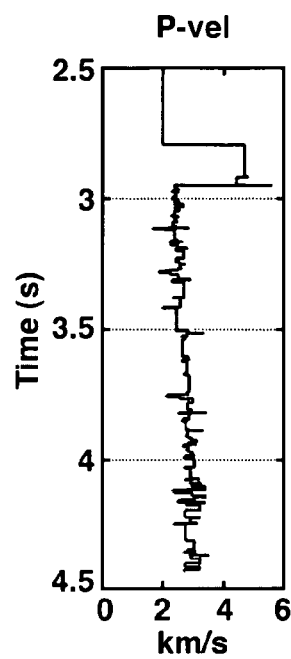
Figure 5C:
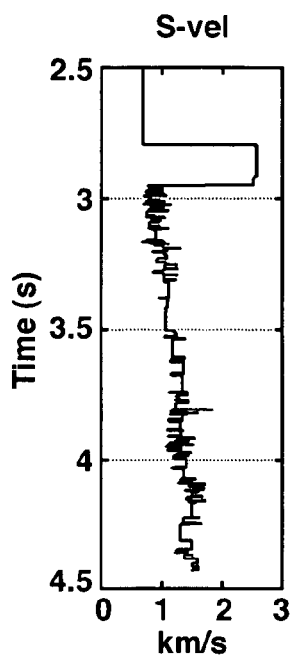
Figure 6A:
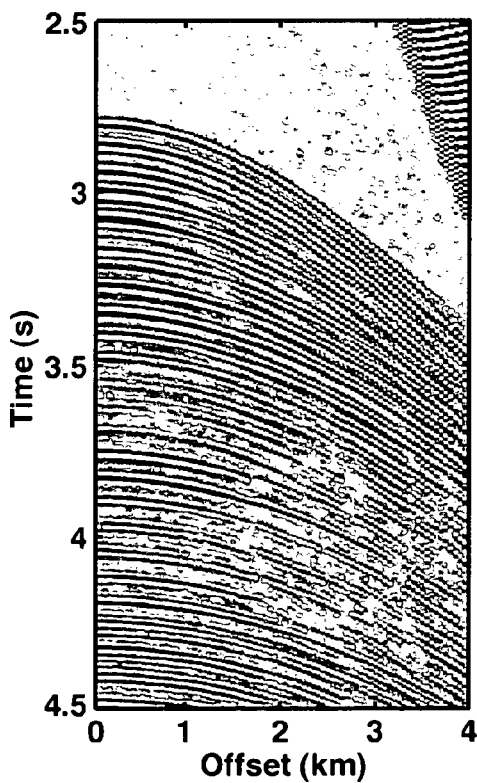
FIGS. 6(a) and 6(b) illustrate common depth point (CDP) gathers of pressure and vertical velocity seismic data traces respectively.
Figure 6B:
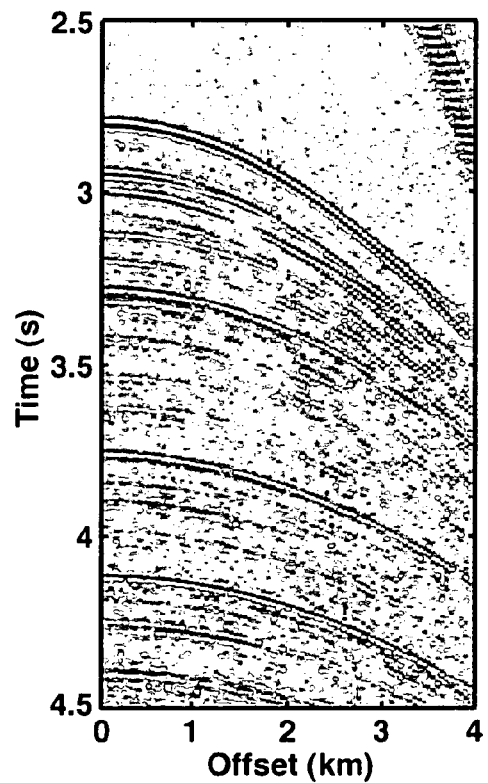

The inventive method is now demonstrated using hypothetical seismic data. The subsurface is assumed to be composed of horizontal layers. FIGS. 5(a), 5(b) and 5(c) show the density (rho) 51, compressional velocity (Vp) 53, and shear velocity (Vs) 55 respectively versus zero-offset reflection time. Not shown is a 50 m deep-water layer at the top of the model (rho=1 g/cc and Vp=1500 m/s) which is bounded above by a pressure release surface. The measured data elements will be two common depth point (CDP) gathers of synthetic ocean bottom cable data collected with co-located hydrophone and vertical geophone sensors on the water bottom. The CDP for pressure 61 and vertical velocity 63 gathers are respectively shown in FIGS. 6(a) and 6(b). The inventive method will be applied to combine the CDP gathers to form a new CDP gather with reduced multiple levels.

The synthetic seismic data used in this demonstration was created using software which solves the elastic wave equation by the wavenumber integration technique. In commercial application of the inventive method, the data would come from a seismic survey acquired using techniques familiar to persons of ordinary skill in the art (as described in step 401 of FIG. 4).

Figure 7B:
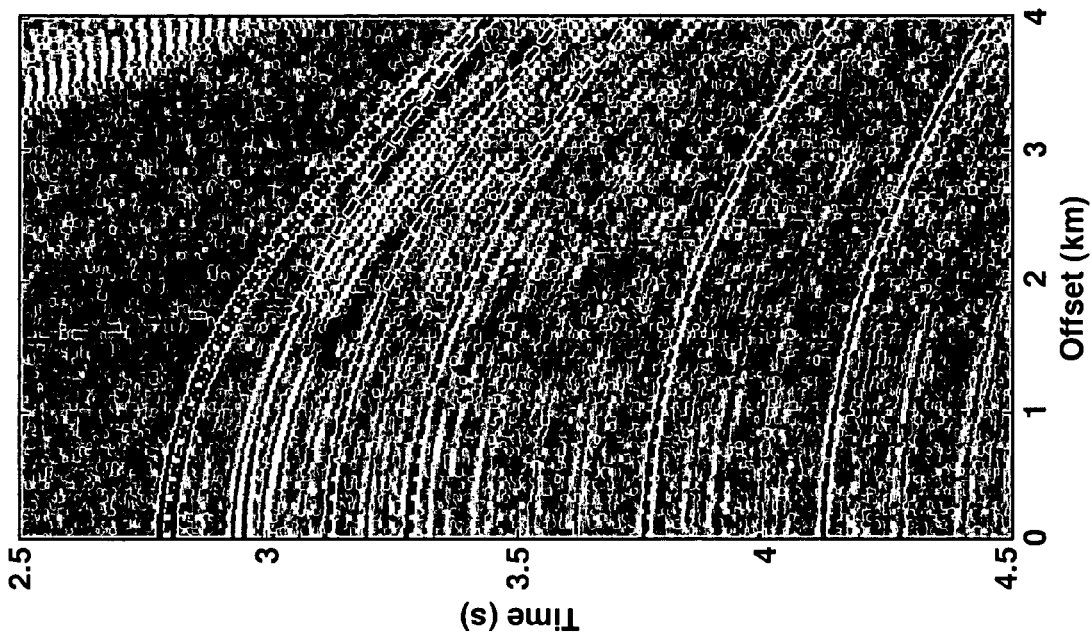
FIG. 7(b) illustrates moveout curves for the selected velocity spectrum peaks.
Figure 7A:
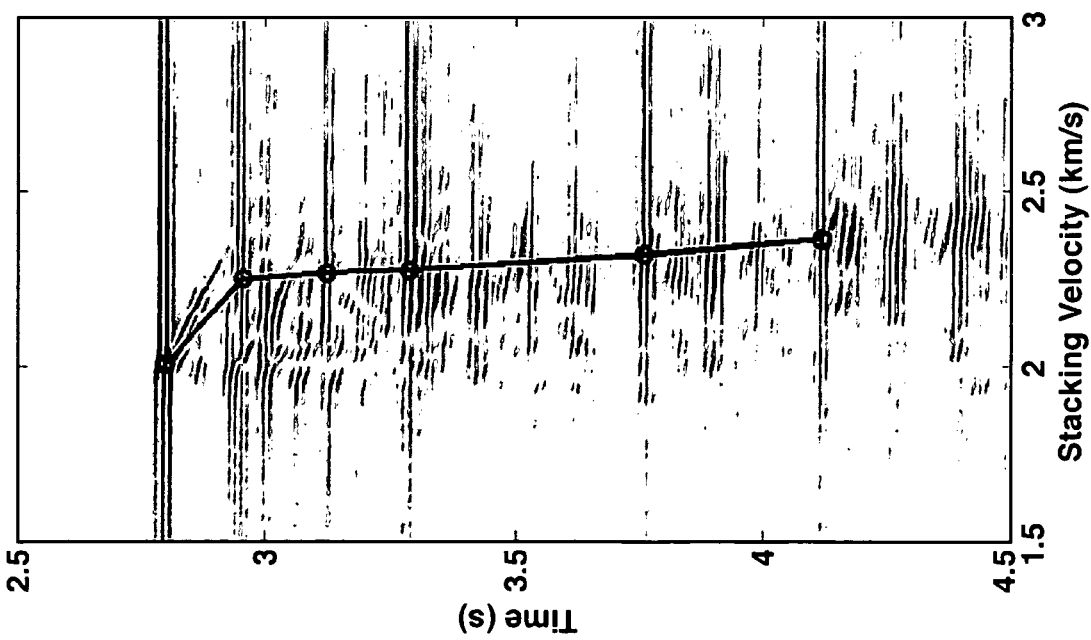
FIG. 7(a) illustrates a velocity spectrum and the interpolated velocity profile based on travel time.

Now, corresponding to step 402 in FIG. 4, the local parameters were determined. The necessary parameters in this example are the stacking velocities as a function of depth, the bottom reflection coefficient, reverberation time, and the sound velocity in water. First, the stacking velocities were determined as a function of depth. This was accomplished by computing a velocity spectrum of the geophone gather (which generally has less multiple-related energy than the pressure data) and interpolating a profile from the dominant peaks in this spectrum. This method is commonly known and applied in the seismic exploration industry. FIG. 7(a) illustrates the velocity spectrum 71 and the interpolated velocity profile 73 as it varies with zero-offset travel time. FIG. 7(b) illustrates the moveout curves 75 for the selected velocity spectrum peaks 77.

Figure 8A:
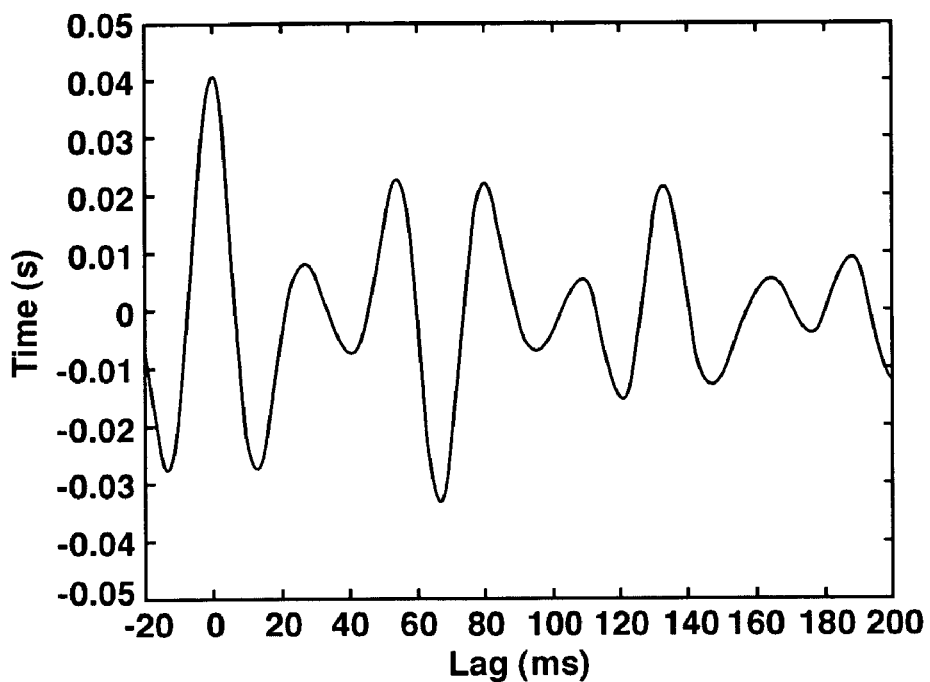
FIG. 8(a) illustrates the averaged autocorrelation function of thenear-offset pressure seismic data traces within a time window.
Figure 8B:
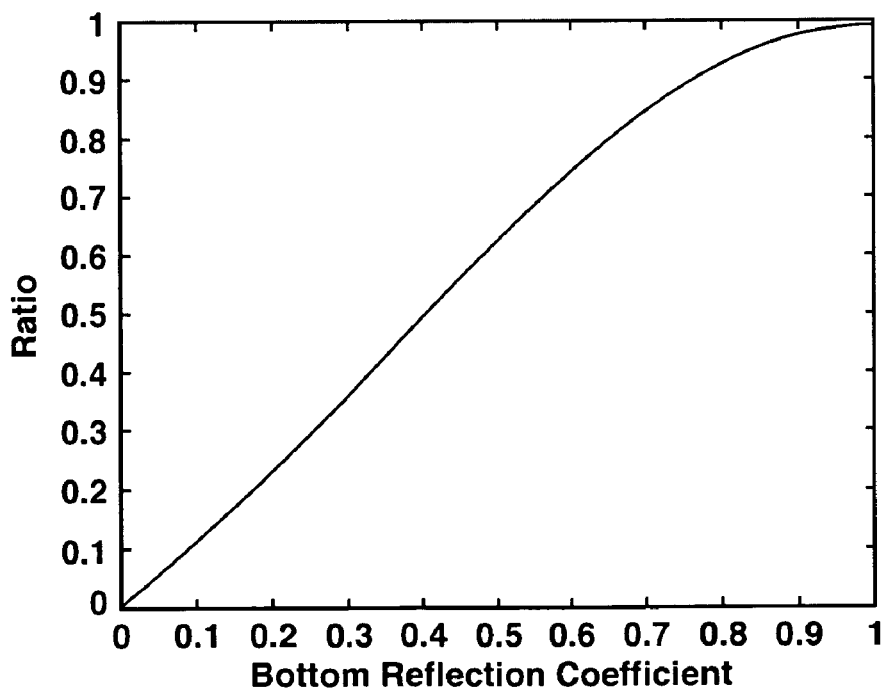
FIG. 8(b) illustrates the relationship between the ratio of largest negative peak amplitude to zero-delay peak amplitude to the bottom reflection coefficient, and the inferred bottom reflection coefficient.

The reverberation time and bottom reflection coefficient were obtained by performing an autocorrelation on the near offset pressure traces. FIG. 8(a) illustrates the average autocorrelation function 88 of the ten nearest-offset pressure traces in the time window from 2.5 to 4.5 seconds. The zero-delay peak 81 and largest negative peak 83 are both identified. The time delay 84 associated with the largest negative peak 83 of the autocorrelation was taken to be the reverberation time and the relative amplitude of the second multiple peak 82 to the first multiple peak 83 was used to infer the bottom reflection coefficient. FIG. 8(b) illustrates the relationship 85 between the ratio of second multiple peak to first multiple peak amplitude and bottom reflection coefficient. This ratio 86 and the inferred bottom reflection coefficient 87 are indicated.

The sound velocity in water was assumed to be known accurately. In field operations, this information would typically be computed from shipboard measurements of temperature (and sometimes salinity) profiles. The source depth and sensor offsets were also assumed to be known accurately.

Figure 9B:
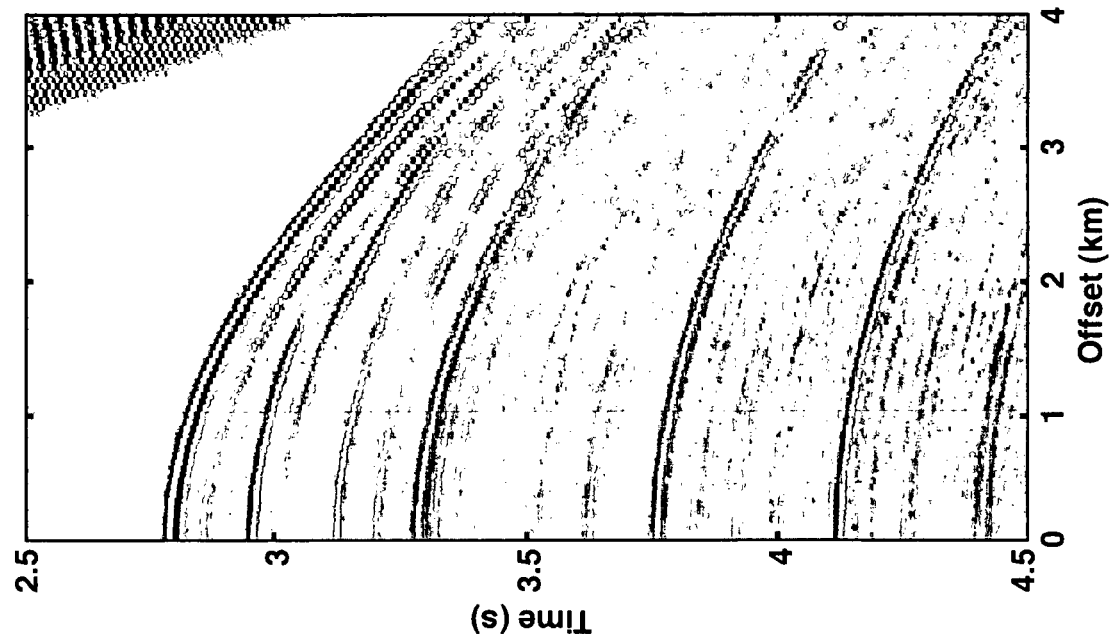
FIG. 9(b) illustrates the resulting CDP gather from application of the minimum mean squared error estimator to the sufficient statistic CDP gather.
Figure 9A:
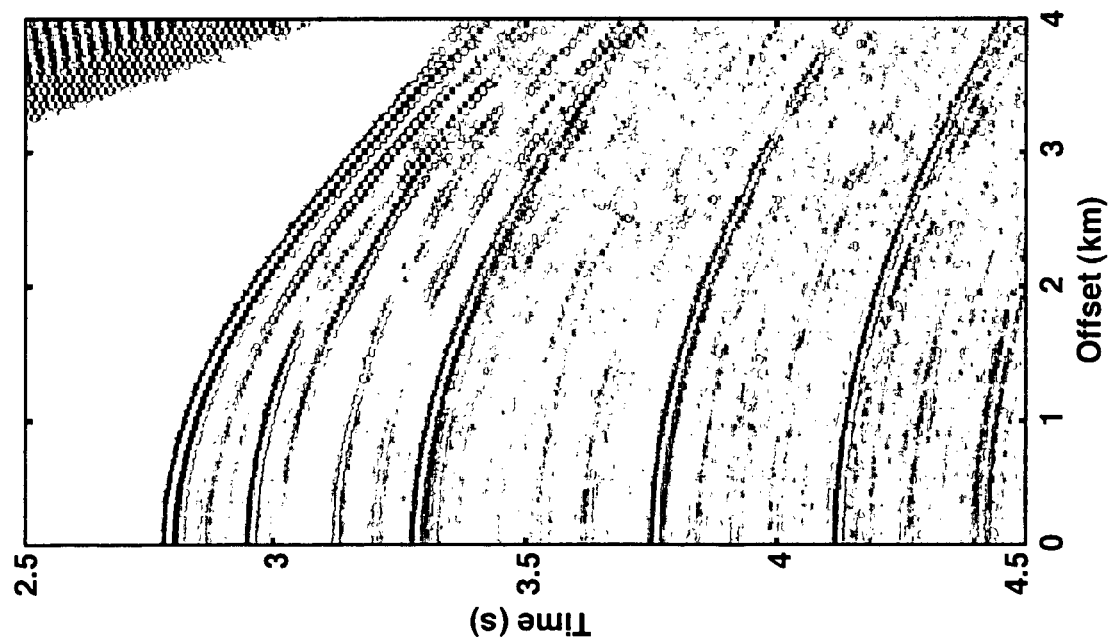
FIG. 9(a) illustrates the sufficient statistic CDP gather derived from the pressure and vertical velocity CDP gathers.

Now, corresponding to step 403 in FIG. 4, the model filters were generated and corresponding to step 404, the noise statistics were characterized. As illustrated in FIG. 9(a) and corresponding to step 405, the sufficient statistic 91 was created.

Now, corresponding to step 406, a SISO operation was applied, in this case transforming the sufficient statistic into the minimum mean squared error estimate of the multiple-free gather. FIG. 9(b) illustrates the results of the minimum mean squared error estimate 93. Note that the random noise level is less in FIG. 9(b) when compared to the sufficient statistic 91 in FIG. 9(a).

We claim:

1. A method for combining at least two seismic data sets comprising:
    a) determining model filters relating at least two measured data elements from said seismic data sets to a desired data element, wherein at least one model filter is a linear time-invariant and space-invariant filter specified in frequency/wavenumber domain;
    b) determining at least one noise characteristic for the measured data elements;
    c) forming a sufficient statistic for the desired data element from the measured data elements based on at least one noise characteristic and the model filters;
    d) using the sufficient statistic for the desired data element to generate a subsurface image.

2. The method of claim 1 wherein at least one noise characteristic determined for the measured data elements comprises non-zero correlations between the noises in the measured data elements.

3. The method of claim 2 wherein at least one data element is chosen from the group consisting of a seismic data trace, a portion of a seismic data trace, a collection of portions of seismic data traces deriving from nearby receiver locations, a collection of portions of seismic data traces having at least one subsurface reflection point near a common subsurface location, a collection of portions of seismic data traces deriving from nearby source locations and any combination thereof.

4. The method of claim 1 wherein the sufficient statistic is the minimum variance unbiased estimate of the desired data element.

5. The method of claim 1, farther comprising processing the sufficient statistic for the desired data element to form an estimate of the desired data element.

6. The method of claim 5, wherein the forming step and the processing step are performed together in a single equivalent mathematical operation.

7. The method of claim 5, wherein the sufficient statistic is processed by using the sufficient statistic in calculating a minimum mean squared error estimate of the desired data element.

8. The method of claim 5, wherein the sufficient statistic is processed by filtering the sufficient statistic in a wavelet basis to form an estimate of the desired data element.

9. The method of claim 1, wherein the at least one noise characteristic is a noise covariance matrix of the measured data elements, and the model filters are determined using at least one local parameter characteristic of the measured data elements' measurement location.

10. The method of claim 9 wherein the noise covariance matrix of the measured data elements comprises non-zero correlations between the data elements.

11. A method of producing hydrocarbons from a subsurface region, comprising:
 a) conducting at least one seismic survey of the subterranean region resulting in at least two seismic data sets;
 b) obtaining a combined data set from the at least two data sets wherein the combination was performed by steps comprising:
  determining model filters relating at least two measured data elements from the seismic data sets to a desired data element,
  determining at least one noise characteristic for the measured data elements,
  forming a sufficient statistic for the desired data element from the measured data elements based on at least one noise characteristic and the model filters, and
  using the sufficient statistic to generate a subsurface image;
 c) producing hydrocarbons from the subsurface region under a development plan based at least in part based on the subsurface image.

12. The method of claim 11, wherein the at least one noise characteristic is a noise covariance matrix of the measured data elements, and the model filters are determined using at least one local parameter characteristic of the measured data elements' measurement location.

13. The method of claim 12 wherein the noise covariance matrix of the measured data elements comprises non-zero correlations between the data elements.

14. A method for combining at least two seismic data sets comprising:
 a) determining model filters relating at least two measured data elements from said seismic data sets to a desired data element;
 b) determining at least one noise characteristic for the measured data elements;
 c) forming a sufficient statistic for the desired data element from the measured data elements based on at least one noise characteristic and the model filters;
 d) processing the sufficient statistic for the desired data element to form an estimate of the desired data element, wherein the sufficient statistic is processed by using the sufficient statistic in calculating a minimum mean squared error estimate of the desired data element; and
 e) using the estimate of the desired data element to generate a subsurface image.

15. A method for combining at least two seismic data sets comprising:
 a) determining model filters relating at least two measured data elements from said seismic data sets to a desired data element;
 b) determining at least one noise characteristic for the measured data elements;
 c) forming a sufficient statistic for the desired data element from the measured data elements based on at least one noise characteristic and the model filters;
 d) processing the sufficient statistic for the desired data element to form an estimate of the desired data element, wherein the sufficient statistic is processed by filtering the sufficient statistic in a wavelet basis to form an estimate of the desired data element; and
 e) using the estimate of the desired data element to generate a subsurface image.

16. A method for combining at least two seismic data sets comprising:
 a) determining model filters relating at least two measured data elements from said seismic data sets to a desired data element, wherein at least one model filter is a linear time-invariant filter specified in frequency domain;
 b) determining at least one noise characteristic for the measured data elements, said at least one noise characteristic comprising non-zero correlations between the noises in the measured data elements;
 c) forming a sufficient statistic for the desired data element from the measured data elements based on at least one noise characteristic and the model filters;
 d) using the sufficient statistic for the desired data element to generate a subsurface image.

17. The method of claim 16, wherein the at least one noise characteristic is a noise covariance matrix of the measured data elements, and the model filters are determined using at least one local parameter characteristic of the measured data elements' measurement location.

18. The method of claim 17, wherein the noise covariance matrix of the measured data elements comprises non-zero correlations between the data elements.

* * * * *